US008244610B2

(12) United States Patent
Ulrich et al.

(10) Patent No.: US 8,244,610 B2
(45) Date of Patent: Aug. 14, 2012

(54) LEGAL BILLING ENHANCEMENT METHOD AND APPARATUS

(75) Inventors: James Ulrich, Mount Laurel, NJ (US); Stuart Wexler, Philadelphia, PA (US); Mark Kowit, Elkins Park, PA (US)

(73) Assignee: Invoice Compliance Experts, Marlton, NJ (US)

( * ) Notice: Subject to any disclaimer, the term of this patent is extended or adjusted under 35 U.S.C. 154(b) by 0 days.

(21) Appl. No.: 12/807,303

(22) Filed: Sep. 1, 2010

(65) Prior Publication Data

US 2011/0196768 A1 Aug. 11, 2011

Related U.S. Application Data

(63) Continuation of application No. 12/099,585, filed on Apr. 8, 2008, now abandoned.

(60) Provisional application No. 60/911,032, filed on Apr. 10, 2007.

(51) Int. Cl.

| | |
|---|---|
| ***G07F 19/00*** | (2006.01) |
| ***H04M 15/00*** | (2006.01) |
| ***G06F 15/02*** | (2006.01) |
| ***G07C 1/10*** | (2006.01) |

(52) U.S. Cl. ............................................ 705/34; 705/32

(58) Field of Classification Search .................... 705/34, 705/32

See application file for complete search history.

(56) References Cited

U.S. PATENT DOCUMENTS

| | | | | |
|---|---|---|---|---|
| 5,991,742 | A * | 11/1999 | Tran | 705/32 |
| 6,029,144 | A * | 2/2000 | Barrett et al. | 705/30 |
| 6,360,211 | B1 * | 3/2002 | Anderson et al. | 705/40 |
| 6,377,938 | B1 * | 4/2002 | Block et al. | 705/32 |
| 6,532,465 | B2 * | 3/2003 | Hartley et al. | 707/610 |
| 6,882,986 | B1 * | 4/2005 | Heinemann et al. | 705/40 |
| 6,934,691 | B1 * | 8/2005 | Simpson et al. | 705/34 |
| 7,010,493 | B2 * | 3/2006 | Yamamoto et al. | 705/32 |
| 7,069,498 | B1 * | 6/2006 | Finch et al. | 715/234 |
| 7,120,602 | B2 * | 10/2006 | Kitchen et al. | 705/40 |
| 7,222,293 | B1 * | 5/2007 | Zapiec et al. | 715/205 |
| 7,840,455 | B1 * | 11/2010 | Venkatasubramanian et al. | 705/30 |
| 2001/0011240 | A1 * | 8/2001 | Wardin et al. | 705/34 |
| 2001/0034675 | A1 * | 10/2001 | Belford et al. | 705/30 |

(Continued)

OTHER PUBLICATIONS

Legal electronic data exchange standards, Business wire, New York, Oct. 23, 2007.*

*Primary Examiner* — Garcia Ade
*Assistant Examiner* — Harshad Parikh
(74) *Attorney, Agent, or Firm* — Duane Morris LLP

(57) ABSTRACT

A method of creating a finalized invoice, having steps of creating a preliminary invoice, the invoice including individual tasks for activities accomplished, submitting the preliminary invoice to an automated rules engine, searching the preliminary invoice for keywords that define possible violations of a company's litigation billing guidelines, highlighting any invoice task that contains identified keywords that would define a possible violation of a company's litigation billing guidelines, querying a user to accept changes to an invoice task based upon the identified keywords, and modifying the preliminary invoice into the finalized invoice after the accepted changes have been conducted after the querying of the user. Using the searchable database to create reports that provide average rates charged by law firms on specific types of legal matters in all geographic areas, reports to evaluate which tasks are not being fully compensated by a specific company or legal auditing system, reports to evaluate the average cost to defend specific types of cases in specific jurisdictions.

7 Claims, 6 Drawing Sheets

U.S. PATENT DOCUMENTS

| | | | | |
|---|---|---|---|---|
| 2002/0026394 | A1 * | 2/2002 | Savage et al. | 705/34 |
| 2002/0077977 | A1 * | 6/2002 | Neely et al. | 705/40 |
| 2002/0082990 | A1 * | 6/2002 | Jones | 705/40 |
| 2003/0018496 | A1 * | 1/2003 | Hambright et al. | 705/2 |
| 2003/0036986 | A1 * | 2/2003 | Bird | 705/34 |
| 2003/0046196 | A1 * | 3/2003 | Kelly | 705/32 |
| 2003/0093319 | A1 * | 5/2003 | Jarman | 705/14 |
| 2003/0130943 | A1 * | 7/2003 | Campbell et al. | 705/40 |
| 2003/0158832 | A1 * | 8/2003 | Sijacic et al. | 707/1 |
| 2003/0191701 | A1 * | 10/2003 | Haseltine et al. | 705/34 |
| 2004/0044602 | A1 * | 3/2004 | Christine Batur et al. | 705/34 |
| 2004/0064389 | A1 * | 4/2004 | Force et al. | 705/34 |
| 2004/0078330 | A1 * | 4/2004 | Henry | 705/40 |
| 2004/0088324 | A1 * | 5/2004 | Khan et al. | 707/104.1 |
| 2004/0133488 | A1 * | 7/2004 | Daidone et al. | 705/34 |
| 2004/0153404 | A1 * | 8/2004 | Rischmueller et al. | 705/40 |
| 2004/0215508 | A1 * | 10/2004 | Rebenack et al. | 705/14 |
| 2004/0267558 | A1 * | 12/2004 | Lundberg | 705/1 |
| 2005/0060250 | A1 * | 3/2005 | Heller et al. | 705/34 |
| 2005/0125320 | A1 * | 6/2005 | Boesen | 705/34 |
| 2005/0131780 | A1 * | 6/2005 | Princen | 705/30 |
| 2005/0137978 | A1 * | 6/2005 | Ganesan et al. | 705/40 |
| 2005/0149416 | A1 * | 7/2005 | Benco et al. | 705/34 |
| 2005/0165681 | A1 * | 7/2005 | Heinemann et al. | 705/40 |
| 2005/0177476 | A1 * | 8/2005 | McCandless et al. | 705/32 |
| 2005/0187839 | A1 * | 8/2005 | Butera et al. | 705/32 |
| 2005/0203814 | A1 * | 9/2005 | Derry et al. | 705/30 |
| 2005/0216382 | A1 * | 9/2005 | Chambers et al. | 705/34 |
| 2005/0289028 | A1 * | 12/2005 | Lundberg | 705/32 |
| 2006/0004604 | A1 * | 1/2006 | White | 705/2 |
| 2006/0015420 | A1 * | 1/2006 | Lundberg | 705/34 |
| 2006/0069630 | A1 * | 3/2006 | McCavitt | 705/34 |
| 2006/0089891 | A1 * | 4/2006 | Nigam | 705/34 |
| 2006/0149644 | A1 * | 7/2006 | Sulmar et al. | 705/34 |
| 2006/0184492 | A1 * | 8/2006 | Long et al. | 706/47 |
| 2006/0190380 | A1 * | 8/2006 | Force et al. | 705/35 |
| 2006/0235728 | A1 * | 10/2006 | Yogesh | 705/3 |
| 2006/0253350 | A1 * | 11/2006 | Falkenhain et al. | 705/34 |
| 2007/0022001 | A1 * | 1/2007 | Jacobs | 705/11 |
| 2007/0027773 | A1 * | 2/2007 | Lee | 705/14 |
| 2007/0038564 | A1 * | 2/2007 | Leavitt et al. | 705/40 |
| 2007/0112650 | A1 * | 5/2007 | Klehr et al. | 705/28 |
| 2007/0214068 | A1 * | 9/2007 | Tadepalli et al. | 705/34 |
| 2007/0226003 | A1 * | 9/2007 | Zapiec et al. | 705/1 |
| 2007/0271160 | A1 * | 11/2007 | Stone et al. | 705/30 |
| 2008/0255972 | A1 * | 10/2008 | Ulrich et al. | 705/34 |
| 2008/0270273 | A1 * | 10/2008 | Koltunov et al. | 705/34 |
| 2009/0037247 | A1 * | 2/2009 | Quinn | 705/8 |
| 2009/0055297 | A1 * | 2/2009 | Gunderman | 705/30 |
| 2009/0299793 | A1 * | 12/2009 | Guzel | 705/8 |
| 2010/0004961 | A1 * | 1/2010 | Alves et al. | 705/7 |
| 2011/0010278 | A1 * | 1/2011 | Bulman et al. | 705/30 |
| 2011/0196768 | A1 * | 8/2011 | Ulrich et al. | 705/34 |

* cited by examiner

GUIDELINE CHECKLIST

1. These items are considered by some companies to be clerical in nature and therefore non-billable. Please check the appropriate box so we can structure the rules and guidelines accordingly:

| ACTIVITY | CLERICAL 212 | PLGL 214 | ATTY 216 |
|---|---|---|---|
| 202 Scheduling | ______ | ______ | ______ |
| 204 Enclosure letters | ______ | ______ | ______ |
| 206 Organizing files | ______ | ______ | ______ |
| 208 Copying | ______ | ______ | ______ |
| 210 Preparing deposition Notices | ______ | ______ | ______ |

2. These items are considered by some companies to be paralegal in nature and reimbursed at a paralegal rate. Please check the appropriate box so we can structure the rules and guidelines accordingly:

| | | | |
|---|---|---|---|
| 218 Preparing Subpoenas | ______ | ______ | ______ |
| 220 Routine discovery (Form interrogatories) | ______ | ______ | ______ |
| 222 Request for Production | ______ | ______ | ______ |
| 224 Page/Line Deposition Digest | ______ | ______ | ______ |

3. Companies reimburse travel at different rates. Please check your preference below:

226 ______ Billable at full hourly rate

228 ______ Billable at 50% of hourly rate for entire trip

FIGURE 2A

230 ________ Billable at 50% for first hour and full rate thereafter

232 ________ Local travel (less than 50 miles) is non-billable; all other travel is billable at the full hourly rate.

Other:

4. Many companies do not permit a law firm to charge for two or more attorneys to attend the same hearing, deposition, or meeting unless specifically authorized. How would you like to treat Duplicate Attendance? Please check the appropriate box:

234 ________ Disallow the charge for the senior timekeeper

236 ________ Disallow the charge for the junior timekeeper

238 ________ Reimburse both charges (do not include this rule in the guidelines)

EXPENSES

5. Please advise how you would like to reimburse the following:

| | 250 Overhead/Not Billable | 252 Allowed | 250 Approval Required |
|---|---|---|---|
| 240 Postage | ________ | ______ | ______ |
| 242 Computerized Legal Research | ________ | ______ | ______ |
| 244 Long Distance Telephone | ________ | ______ | |
| 246 Facsimiles | ________ | ______ | |
| 248 Express Mail | ________ | ______ | ______ |

6. Photocopy Charges: Photocopies should be reimbursed at the below rate:

$.08 ______ $.10 ______ $.12 ________ Other ________

FIGURE 2B

7. How would you like legal research treated:

258 ____________ All legal research requires prior approval

260 ____________ All legal research over 2 hours requires prior approval

262 ____________ There is no restriction on legal research.

8. How would you like motion practice treated:

264 ____________ All motion practice requires approval (except motions in limline where a firm must make a motion during a trial)

266 ____________ All motion practice requiring over ten hours of writing requires prior approval. Any time over 10 hours is non-reimbursable without the approval 268 ____________ There is no restriction on motion practice

FIGURE 2C

LEGAL BILLING ENHANCEMENT METHOD AND APPARATUS

CROSS-REFERENCE TO RELATED APPLICATIONS

This application is a continuation of U.S. patent application Ser. No. 12/099,585, filed Apr. 8, 2008, which is pending and claims priority to U.S. Provisional Patent Application No. 60/911,032, filed Apr. 10, 2007, the entireties of which are herein incorporated by reference.

FIELD OF THE INVENTION

Aspects of the invention relate to law firm invoicing. More specifically, aspects of the invention provide software that identifies activities and expenses that a law firm neglected to include in an invoice or that may be identified as potentially being reduced in fee by legal firm auditing software.

BACKGROUND INFORMATION

The legal auditing industry endeavors to accurately audit legal bills according to best practices and litigation billing guidelines to ensure accurate and timely payment of invoices. To achieve this, rules and guidelines are established for individual clients that are followed when evaluating an invoice. Electronic legal billing standards have been developed by different entities, such as the American Bar Association.

The advent of electronic billing has prompted corporations and insurance companies to require that law firms send their invoices electronically. Generally, each invoice is comprised of separate tasks performed on each matter by law firm personnel and the expenses associated with that matter.

Corporations and insurance companies audit these electronic invoices or employ a third-party vendor to audit the electronic invoices. In order to eliminate the need for a human to inspect each individual line entry, automated rules engines have been built to analyze the law firm invoices and reduce any line entry that may have not conformed to the legal billing guidelines.

The result of the automated rules engines is that law firm invoices are being reduced significantly, and in some cases, inaccurately. The auditing software can inappropriately identify a line entry or line entries on the invoice as being non-compliant with the billing guidelines, thereby either requiring the law firm to modify the line entries on the invoice, or accept reduced payment. While there are systems designed to reduce the value of law firm invoices, there are no systems designed for the law firm to pre-screen their invoices in order to prevent line items on the invoice from being reduced or to check the invoice for inadvertent omissions where a law firm neglected to bill for a task or activity performed on the matter.

There is a need to provide a pre-screening process for law firm invoices to ensure that law firm invoices accurately describe the actions taken.

There is a further need to provide a law firm report to increase the effectiveness of their billing practices.

There is a further need to provide a law firm report to evaluate average rates charged by law firms on specific types of legal matters in all geographic areas.

There is a further need to provide a law firm report to evaluate which tasks are being reduced by a specific company or legal auditing system.

There is a further need to provide a law firm report that evaluates the average cost to defend a certain type of legal matter in a specific jurisdiction.

There is a further need to have a budgeting module which will allow firms to accurately budget for a specific type of case in a specific jurisdiction.

There is a further need to provide a data warehouse for a firm's legal billing.

SUMMARY OF THE INVENTION

The objectives of the invention are achieved as illustrated and described. A method of creating a finalized invoice is presented. It is comprised of analyzing a preliminary invoice which includes individual tasks for activities accomplished, submitting the preliminary invoice to an automated rules engine which searches the preliminary invoice for keywords that an auditing system uses to determine if a line entry violates a specific litigation guideline, highlighting any line item on the invoice that contains identified keywords that would prompt a system to reduce the value of the line item, providing alternative phrasing or suggested modifications to the line item that would have an auditing system deem the description acceptable, and allowing the user to modify the line item accordingly so the law firm receives full credit for the task performed.

In another embodiment, the method may further comprise printing the finalized invoice or downloading the invoice into the file format required by the legal auditing system.

In another embodiment, the method is performed such that the automated rules engine is on a mainframe computer.

In another embodiment, the method is performed such that the automated rules engine is on a personal computer.

In another embodiment, a method of creating a finalized invoice, having created a preliminary invoice, the invoice including individual tasks for activities accomplished, submitting the preliminary invoice to an automated rules engine; searching the preliminary invoice for missing tasks as defined by the individual tasks for activities accomplished, querying a user to add a line entry based upon the search of the preliminary invoice for the missing tasks, and modifying the preliminary invoice into the finalized invoice after adding the task based upon the search of the preliminary invoice for the missing tasks.

In another embodiment, the method further comprises printing the finalized invoice.

In another embodiment, the method further comprises downloading the finalized invoice into a format required by the auditing software.

In another embodiment, the method is performed such that the automated rules engine is on a mainframe computer.

In another embodiment, the method is performed such that the automated rules engine is on a personal computer.

In another embodiment, the method above is performed to further comprise querying a user to define rules for the automated rules engine prior to submitting the preliminary invoice to an automated rules engine.

In another embodiment, the method further comprises querying a user to define rules for the automated rules engine prior to the submitting the preliminary invoice to an automated rules engine.

In another embodiment, the method may be accomplished wherein the querying a user to accept changes to an invoice task based upon the identified keywords.

In another embodiment, the method may be accomplished wherein the creating the preliminary invoice, the invoice including individual tasks for activities accomplished is on a computer using the automated rules engine.

In another embodiment, the method may be accomplished such that the creating the preliminary invoice, the invoice including individual tasks for activities accomplished is not on a computer using the automated rules engine.

In another embodiment, the method is accomplished wherein the creating the preliminary invoice, the invoice including individual tasks for activities accomplished is on a computer using the automated rules engine.

In another embodiment, the method is accomplished wherein the creating the preliminary invoice, the invoice including individual tasks for activities accomplished is not on a computer using the automated rules engine.

In another embodiment, a program storage device readable by machine, tangibly embodying a program of instructions executable by the machine to perform method steps for creating a finalized invoice is presented, the method, comprising creating a preliminary invoice, the invoice including individual tasks for activities accomplished, submitting the preliminary invoice to an automated rules engine,
searching the preliminary invoice for keywords that define lower value activities; highlighting any invoice task that contains identified keywords that would define violations of a rule or guideline, querying a user to accept changes to an invoice task based upon the identified keywords, and modifying the preliminary invoice into the finalized invoice after the accepted changes have been conducted after the querying of the user.

In another embodiment, a program storage device readable by machine, tangibly embodying a program of instructions executable by the machine to perform method steps for creating a finalized invoice, is presented comprising steps of creating a preliminary invoice, the invoice including individual tasks for activities accomplished, submitting the preliminary invoice to an automated rules engine;
searching the preliminary invoice for missing tasks as defined by the individual tasks for activities accomplished, querying a user to add a task based upon the search of the preliminary invoice for the missing tasks; and modifying the preliminary invoice into the finalized invoice after the adding the task based upon the search of the preliminary invoice for the missing tasks.

BRIEF DESCRIPTION OF THE DRAWINGS

FIG. 2A is a first list of the questions posed to a law firm regarding the guidelines to be applied by the system.

FIG. 2B is a second list of questions posed to a law firm regarding guidelines to be applied by the system.

FIG. 2C is a third list of questions posed to a law firm regarding guidelines to be applied by the system.

DETAILED DESCRIPTION

In one embodiment of the invention, a system is designed to counteract legal auditing software automated rules engines that are designed to reduce law firm invoices, as well as a supplement law firm invoices with line entries that were inadvertently left off the invoice. An additional aspect of the law firm invoice is to generate more acceptable phraseology, in order to maximize invoice financial return by skirting legal auditing software rules engines.

Figure 1:
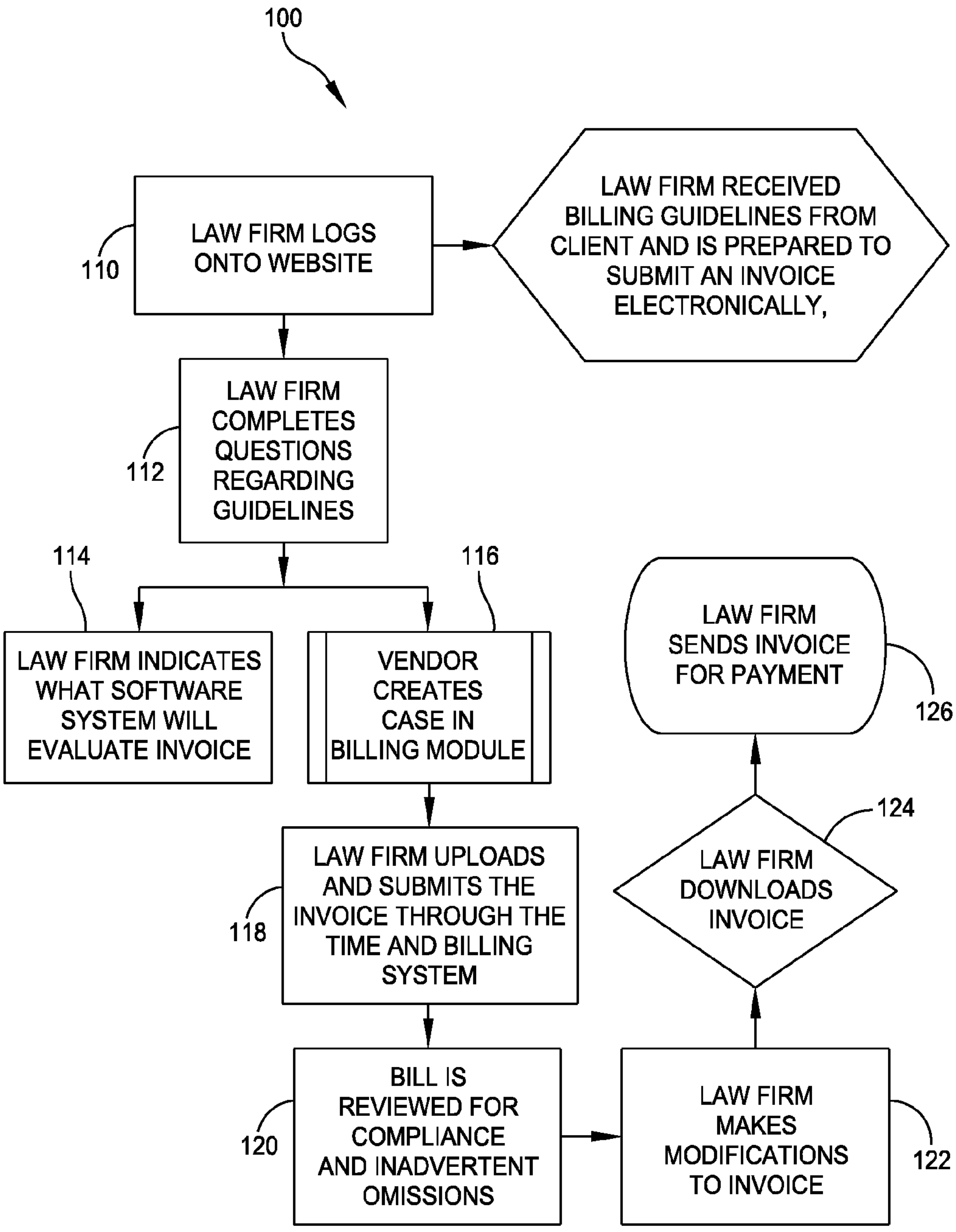
FIG. 1 is a flow chart setting forth process steps for submitting and evaluating an invoice.

Referring to FIG. 1, an automated rules engine of the system is used to identify potentially problematic line entries in draft legal bills/invoices. The system provides suggested phrasing or wording for the law firm to use when a line entry is deemed to be subject to reduction. A method 100 to use an automated rules engine to modify a legal bill is provided. First, a law firm, or other entity, logs onto a website containing the system that analyzes law firm bills 110. Alternatively, the software for the system may be placed upon a stand-alone computer and accessed locally. The law firm or other entity completes questions regarding guidelines that the invoice should follow 112. Then, the law firm may indicate what software system will evaluate the invoice 114. The system then creates a case in a billing module 116. The law firm then uploads and submits a draft invoice through the time and billing system 118 into the billing module. Alternatively, the law firm may directly enter the individual line item entries into the system. The bill is then reviewed for compliance with standards established in the system 120. The systems uses an automated rules engine that "flags" line entries on a legal invoice that may violate a set of rules or guidelines imposed by an entity that engages the law firm for legal services. The guidelines may be varied or chosen according to a specific client or may be chosen through a standardized option list available to the user.

The invoice is also reviewed for inadvertent omissions, as described later. Moreover, the system also offers the law firm alternative phrases and descriptions to describe their activities. These alternative phrases or descriptions are chosen such that the new line entries in the invoice will avoid the scrutiny of an electronic rules engine used by legal auditing system software.

After the modifications are made to the invoice by the law firm 122, the law firm downloads the invoice from the system 124. The law firm may then send the invoice to the client for payment.

In an additional embodiment, the system searches for activities that the law firm failed to include on their respective invoice. As an example, law firms include both legal fees for attorney time and expenses on a legal invoice. It is a common error for a law firm, for example, to invoice a client for a specific expense (travel costs) while neglecting to invoice for the associated fee related to attorney travel. The system, however, prevents erroneous bills wherein if the law firm bills for a travel expense on a specific date (such as for airline ticket fees), the system will search for an attorney based travel fee on the same date. If the associated attorney based travel fee item is not found by the automated search, the billing module will prompt the law firm to add the line entry such that the invoice is consistent.

To add flexibility of use to firms creating invoices, a legal invoice can be either submitted electronically and uploaded into the legal billing system or inputted manually into the legal billing module. The system, through its configuration, reads each line entry in the billing invoice by performing a search for keywords, phrases, and task billing codes that legal auditing systems typically use to determine the nature of the activity performed by the timekeeper and whether or not the activity should be credited to the attorney at his or her prevailing rate, a reduced rate, or not at all. These keywords are highlighted such that if an attorney performed a task that is deemed "paralegal" in nature by a company's litigation guidelines, the line item is noted by auditing software as "paralegal" in nature, the value of the line entry will be noted as of reduced value (i.e. a lower billable hour rate.) To avoid being characterized as a task paid at a lower rate or a non-reimbursable task, for example, these "keywords" are highlighted in the invoice system and alternative words are suggested to be substituted for the "keywords" that trigger identification by the auditing software. With the system, the law firm is alerted that these same line entries are potentially subject to reduction.

The system is also configured to track the fees and expenses associated with the invoice, and then when the law firm is finished modifying their invoice, the module will produce a report with the corresponding changes made to the law firm invoices.

The invention can be used as a stand-alone product or integrated with a law firm time and billing system. The system is also able to be web based or installed on a user system.

The guidelines used by the system are stored in searchable databases that allow a user to view why a particular line entry may not conform to their clients billing standards. Changes performed to invoices are also stored on the system for future retrieval.

The system is also configured such that a user is able to search for wording or phrases in invoices that have been deemed acceptable by legal auditing systems in the past and report on the consistency of the audits being performed by a software system or person applying the litigation guidelines against the invoice. The user can also run a report providing aggregate data regarding the different rules or guidelines a company or corporation may have in force for other law firms and the application of those rules and guidelines Although described as pertaining to the correction and modification of all legal invoices, the system is not limited to a particular type of bill or industry, therefore other invoices may be checked that are reviewed by automated rules engines.

In addition to the above, when guidelines have changed for automated rules engines, or there is a need to input rules for a new client, a law firm user will be able to input rules and guidelines with the help of a guideline wizard.

Referring to FIG. 2, a list of the questions posed to a law firm regarding the guidelines to be applied to individual is provided. As each client may separately have identification techniques for different invoices, the system allows firms to input information to highlight potential areas of concern. Such areas of concern may be scheduling concerns 202, enclosures letters 204, organizing files 206, copying 208 and preparing deposition notices 210. Each of the areas of concern may be identified as clerical responsibility 212, paralegal responsibility 214 or attorney responsibility 216. Other preferences may be added, such as preparing subpoenas 218, routine discovery 220, requests for production 222 and page/line deposition digest 224. Company reimbursement for travel may also be specified by the system at a full hourly rate 226, referring to FIG. 2B, a billable hour rate of 50% 228, a billable hour rate of 50% for the first hour and full rate thereafter 230, and a local travel rate of non-billable costs 232. Charges may also be disallowed for a senior timekeeper 234, a junior timekeeper 236 or reimbursement may be allowed for both charges 238 for when multiple attorneys attend a hearing, deposition or meeting.

Expenses may also be checked by the system wherein postage 240, computerized legal research 242, long distance telephone calls 244, facsimiles 246 and express mail 248 may be included as overhead 250, allowed 252 or requiring approval 254.

Photocopy charges may also be reimbursed at differing rates 256. Referring to FIG. 2C, legal research may be noted as requiring prior approval 258, legal research over 2 hours requires prior approval 260 or there is no restriction on legal research 262.

Motion practice may also be identified by the system such that all motion practice requires prior approval (except motions in limine where a firm must make a motion during a trial) 264, all motion practice requiring over ten hours of writing requires prior approval. Any time over 10 hours is non-reimbursable without approval 266 and there is no restriction on motion practice 268.

Figure 3:
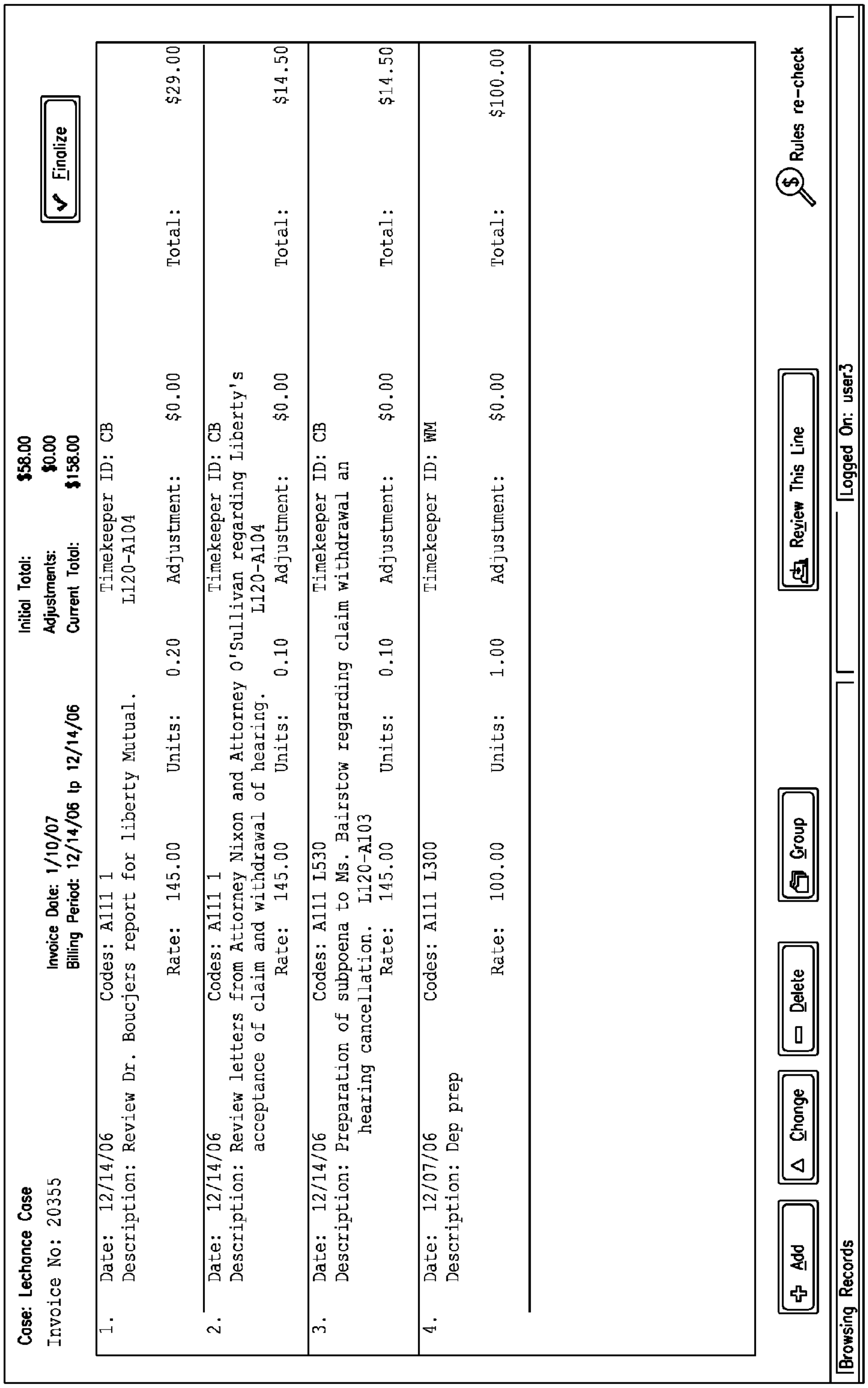
FIG. 3 is a rules engine flagging a line entry that may be deemed as guideline violations.

Referring to FIG. 3, a screen shot of a result of the rules engine of the system flagging hypothetical line entries that may be deemed as guideline violations is presented. In the illustrated embodiment, preparation of a subpoena regarding claim withdrawal and hearing cancellation is noted as being charged above a paralegal rate. The system has identified this specific line item as being performed by a paralegal as the keyword criteria of the system identify keywords such as preparation of subpoena.

If the actual line item was completed by an attorney instead of a paralegal, alternative wording may be selected by either the law firm or may be substituted by the system, thereby preventing the line item from being identified by legal bill auditing software as a violation of the billing guidelines.

Figure 4:
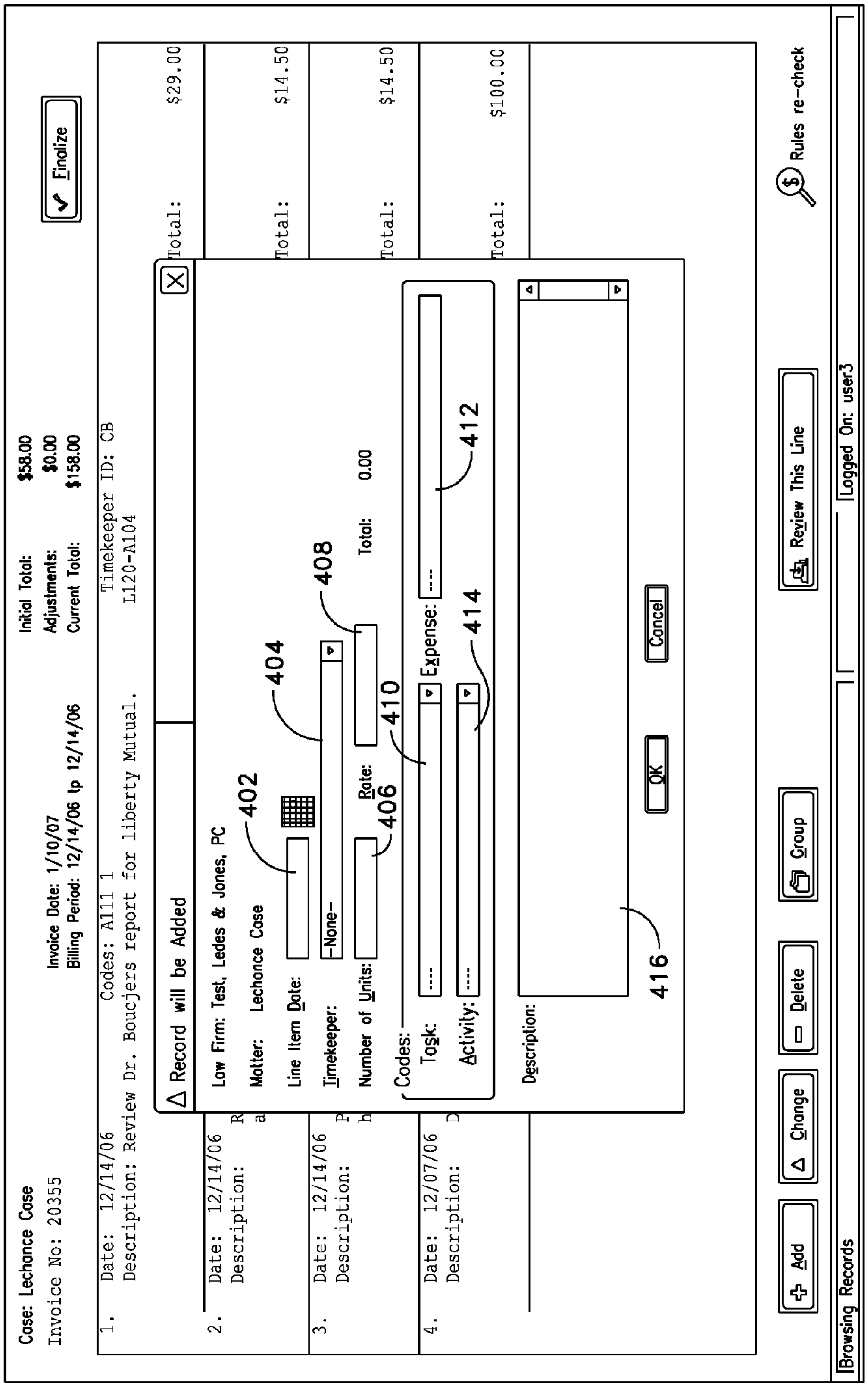
FIG. 4 shows the ability to add a line entry that was flagged by a rules engine as an inadvertent omission.

Referring to FIG. 4, a screen shot of a result of a rules engine system flagging an omission in an invoice is presented. In the illustrated embodiment, an individual line item is needed to be added as the invoice is missing an essential activity. The rules engine of the system inquires of the operator the line item date 402, a time keeper identification 404, a number of units (of time) 406, a rate at which the number of units (of time) is charged 408. Individual codes for tasks 410, expenses 412 and activities 414. A description 416 may also be included in the record to be added.

What is claimed is:

1. A method for checking and creating a finalized invoice before billing a client, the method comprising:

- submitting a preliminary invoice to an automated rules engine running on a computer processor before a final invoice is sent to a client, the preliminary invoice including one or more entries associated with one of a task or an expense;
- automatically searching the preliminary invoice for one of an expense associated with a task listed in the preliminary invoice or a task associated with an expense listed in the preliminary invoice in a computer-implemented process;
- automatically querying a user to add one of the associated expense for the task or the associated task for the expense when the search of the preliminary invoice fails to locate the associated expense or associated task listed in the invoice in a computer-implemented process;
- automatically modifying the preliminary invoice based on a user input received in response to the query in a computer-implemented process, the preliminary invoice including a modified entry that includes the associated expense or the associated task;
- automatically searching the preliminary invoice for at least one of keywords, phrases, and task billing codes that define possible violation of a company's billing guidelines in a computer-implemented process; and
- automatically suggesting to the user alternative at least one of keywords, phrases, and task billing codes to be substituted for those that define possible violation of the company's billing guidelines in a computer-implemented process;
- automatically modifying the preliminary invoice based on a user input received in response to the suggestion in a computer-implemented process, the preliminary invoice including a modified entry that includes the suggested alternative at least one of keywords, phrases, and task billing codes;

automatically searching the preliminary invoice for a related fee activity associated with each specific expense billed in the preliminary invoice in a computer-implemented process, wherein when the automated search of the preliminary invoice fails to find a related fee activity associated with a specific expense billed, the method further comprising automatically prompting the user to add the related fee activity not found in a computer-implemented process;

automatically modifying the preliminary invoice when a related fee activity not found in the preceding step is added by the user in a computer-implemented process, the preliminary invoice including a modified entry that includes the related fee activity added by the user; and automatically generating a final invoice in a computer-implemented process based on the modified entries for sending to a client for payment.

2. The method of claim 1, further comprising:

generating the preliminary invoice in a computer-implemented process before submitting the preliminary invoice to the automated rules engine, wherein the preliminary invoice is submitted electronically to the rules engine.

3. The method of claim 1, wherein the automated rules engine is on one of a mainframe computer or a personal computer.

4. The method of claim 1, further comprising printing the final invoice.

5. The method of claim 1, wherein the task includes time for an attorney to travel.

6. The method of claim 5, wherein the expense includes the cost for a ticket for the travel.

7. The method of claim 1, further comprising:

querying a user to define rules for an automated rules engine before submitting the preliminary invoice to the automated rules engine.

* * * * *